April 21, 1970   M. P. HELDT ET AL   3,507,049
SPLINE WEAR GAUGE
Filed April 22, 1968   5 Sheets-Sheet 1
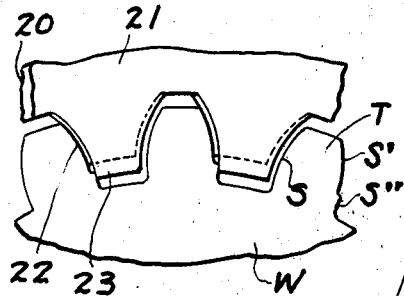
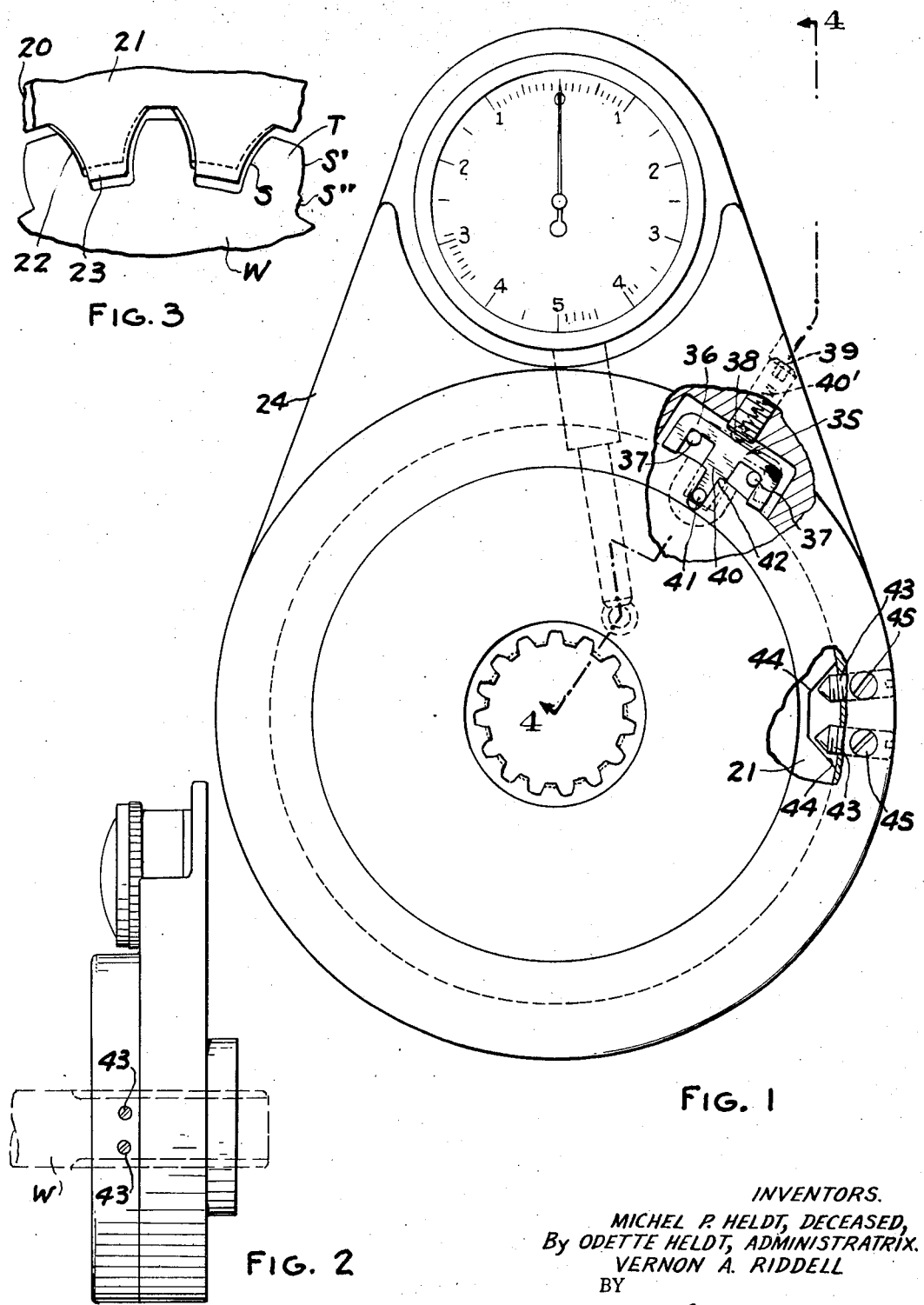
FIG. 3
FIG. 2
FIG. 1
INVENTORS.
MICHEL P. HELDT, DECEASED,
By ODETTE HELDT, ADMINISTRATRIX.
VERNON A. RIDDELL
BY
Barnes, Kisselle, Raisch & Choate
ATTORNEYS April 21, 1970    M. P. HELDT ET AL    3,507,049
SPLINE WEAR GAUGE
Filed April 22, 1968
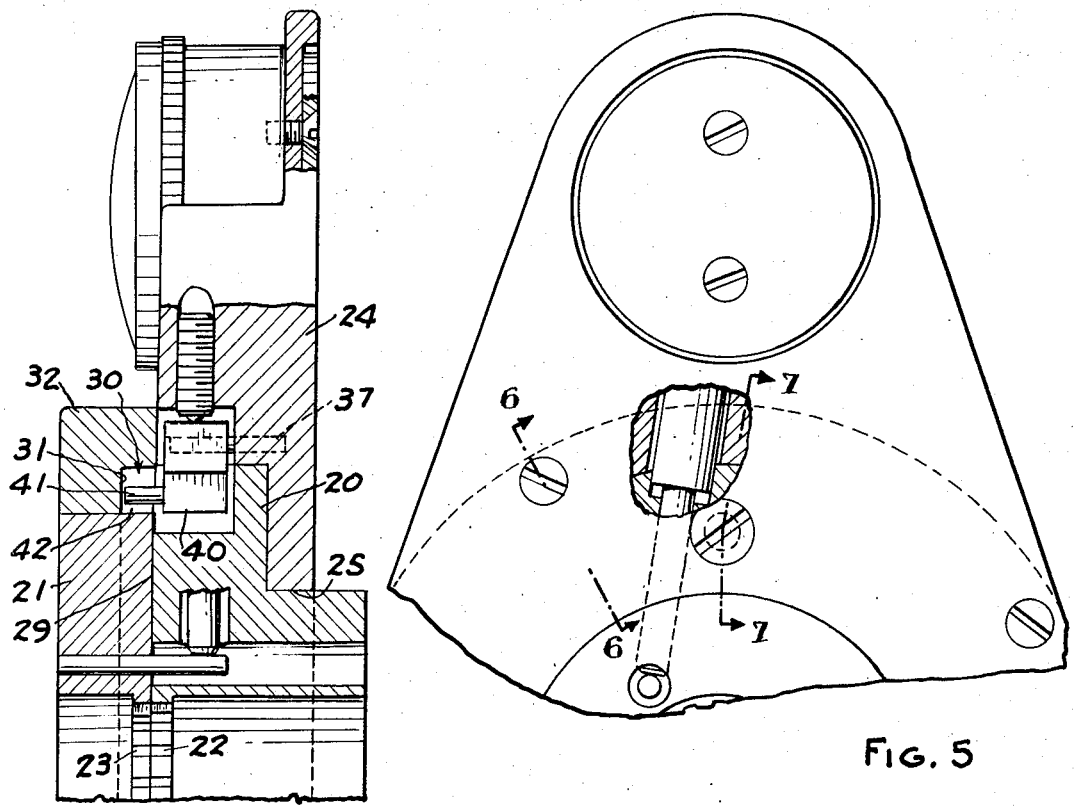
FIG. 4
FIG. 5
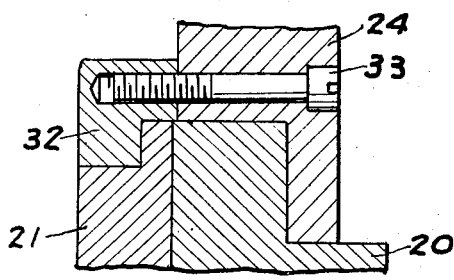
FIG. 6
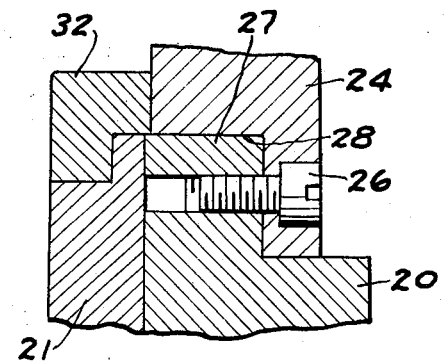
FIG. 7
INVENTORS.
MICHEL P. HELDT, DECEASED,
By ODETTE HELDT, ADMINISTRATRIX.
VERNON A. RIDDELL
BY
Barnes, Kisselle, Raisch & Choate
ATTORNEYS April 21, 1970 M. P. HELDT ET AL 3,507,049
SPLINE WEAR GAUGE
Filed April 22, 1968 5 Sheets-Sheet 3
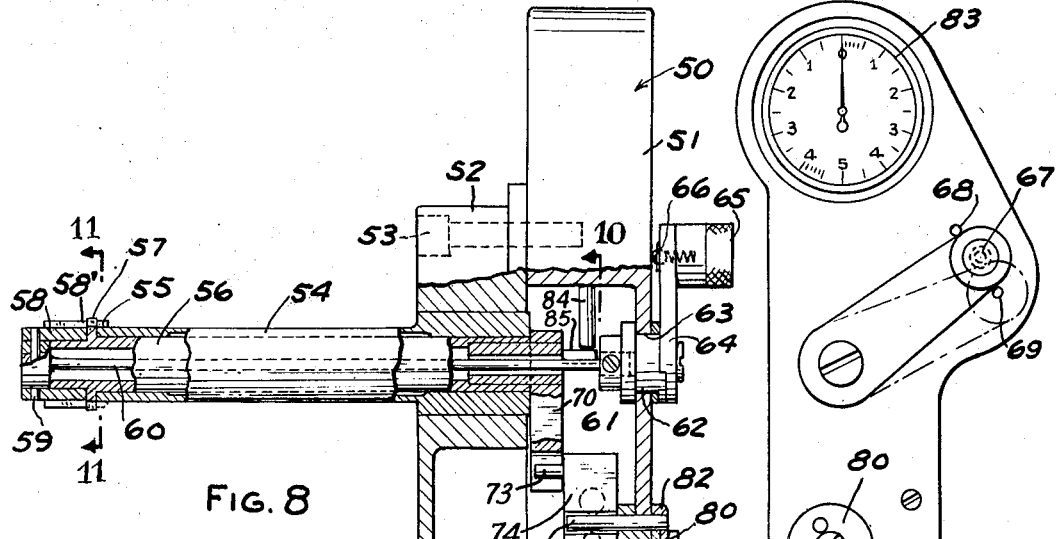
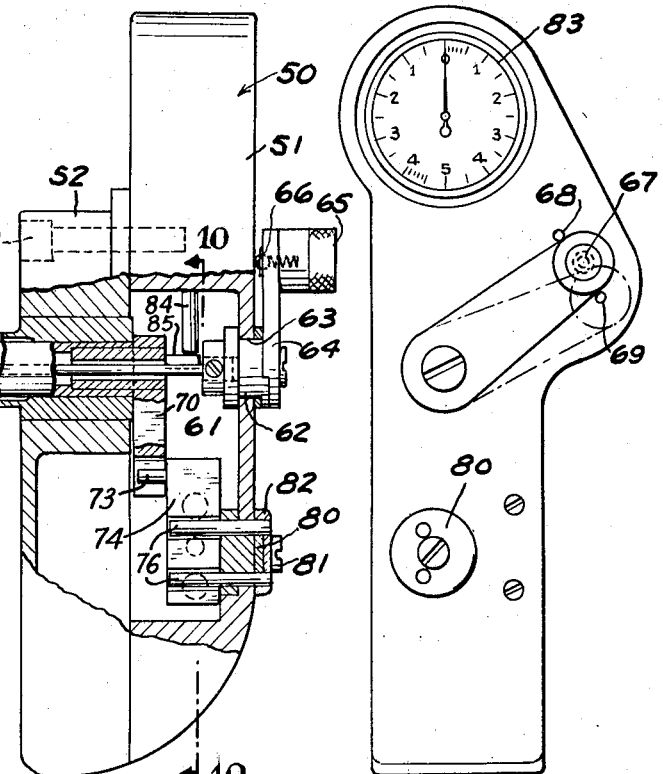
FIG. 8
FIG. 9
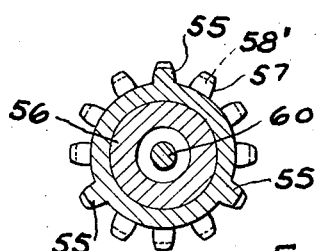
FIG. 11
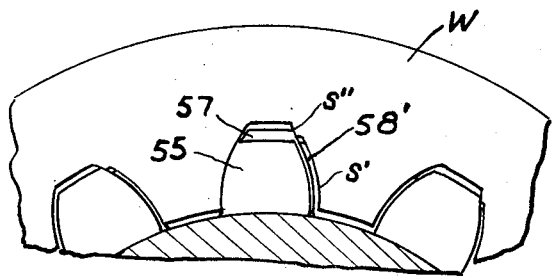
FIG. 12
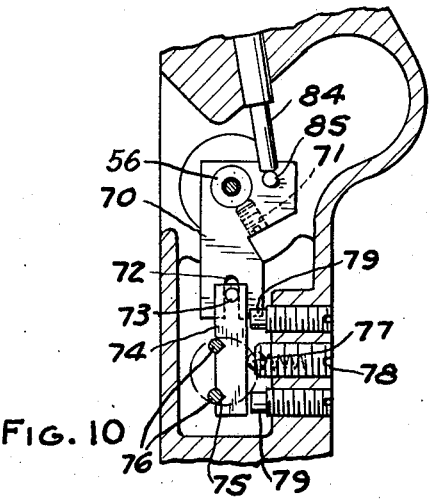
FIG. 10
INVENTORS.
MICHEL P. HELDT, DECEASED,
By ODETTE HELDT, ADMINISTRATRIX.
BY VERNON A. RIDDELL
Barnes, Kisselle, Raisch & Choate
ATTORNEYS INVENTORS.
MICHEL P. HELDT, DECEASED,
By ODETTE HELDT, ADMINISTRATRIX.
VERNON A. RIDDELL
BY
Barnes, Kisselle, Raisch & Choate
ATTORNEYS INVENTORS.
MICHEL P. HELDT, DECEASED,
By ODETTE HELDT, ADMINISTRATRIX.
VERNON A. RIDDELL
BY Barnes, Kisselle, Raisch & Choate
ATTORNEYS United States Patent Office 3,507,049
Patented Apr. 21, 1970

3,507,049
SPLINE WEAR GAUGE
Michel P. Heldt, deceased, late of Detroit, Mich., by Odette Heldt, administratrix, Detroit, and Vernon A. Riddell, Farmington, Mich.; said Riddell assignor, by mesne assignments, to Delta Corporation, a corporation of Connecticut
Filed Apr. 22, 1968, Ser. No. 723,976
Int. Cl. G01m 13/02
U.S. Cl. 33—179.5
23 Claims

ABSTRACT OF THE DISCLOSURE

A spline wear gauge has two gauge members having circumferentially spaced spline teeth, the teeth on one of the members having an addendum longer than the teeth on the other of the members. The members are rotatable relative to one another so that when they are brought into position adjacent the spline being gauged and rotated relative to one another, one of the members contacts the spline teeth of the spline being gauged at a different position than the other of the members. Any wear on the teeth will be evident by a relative rotational movement that is shown visually by a dial indicator on the gauge body.

---

This invention relates to gauging splines and particularly to gauging splines for wear.

It is common to make splines with hardened teeth, the hardening being effective for a predetermined depth on the teeth. As the spline wears in use, the hardened surface wears away and eventually the spline has worn to a position wherein the surface of the teeth of the spline are no longer hardened. It is desirable to be able to sense or gauge the wear of the spline teeth and determine the depth of the wear as it occurs.

Among the objects of the present invention are to provide a spline wear gauge which will effectively gauge the wear of the spline teeth, which is relatively simple, low in cost, easily manipulated, and portable.

In the drawings:

FIG. 1 is a part sectional plan view of a gauge embodying the invention;

FIG. 2 is a side elevational view of the gauge shown in FIG. 1;

FIG. 3 is a fragmentary partly diagrammatic view of a portion of a gauge;

FIG. 4 is a fragmentary sectional view taken along the line 4—4 in FIG. 1;

FIG. 5 is a fragmentary part sectional rear view of the gauge shown in FIG. 1;

FIG. 6 is a fragmentary sectional view taken along the line 6—6 in FIG. 5;

FIG. 7 is a fragmentary sectional view taken along the line 7—7 in FIG. 5;

FIG. 8 is a part sectional side elevational view of a modified form of the spline wear gauge;

FIG. 9 is a front view of the gauge shown in FIG. 8;

FIG. 10 is a fragmentary sectional view taken along the line 10—10 in FIG. 8;

FIG. 11 is a fragmentary sectional view on an enlarged scale taken along the line 11—11 in FIG. 8;

FIG. 12 is a partly diagrammatic view on an enlarged scale of the relative positions of the teeth during gauging of a spline;

Figure 13:
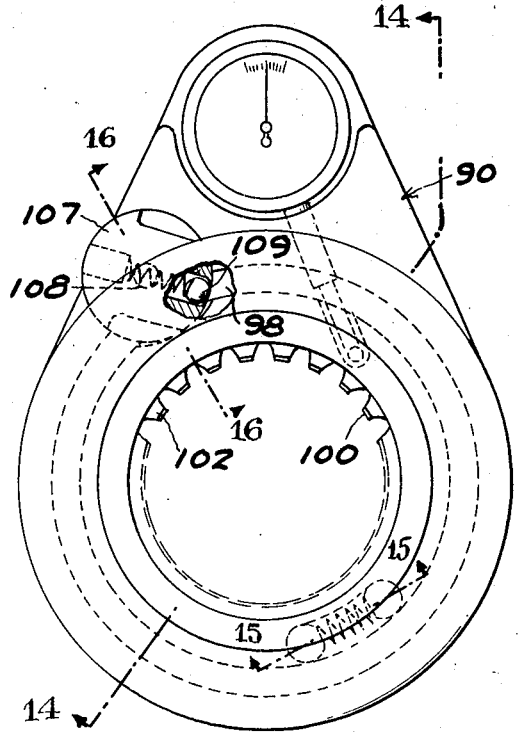
FIG. 13 is a part sectional front view of a further modified form of a gauge.

Referring to FIG. 3, the problem to which the applicant's invention is directed may be better understood by describing a portion of a workpiece W having spline teeth T, the wear of which is to be gauged. In use the surface S of the teeth which are normally hardened wear, the wear occurring because of the intermeshing of the teeth of the spline with the teeth of a mating spline member. As shown in exaggerated form in FIG. 3, the surface S' wears in use with respect to a portion of the tooth near the base thereof S''.

The splines conventionally have convolute configurations in accordance with generally accepted standards wherein the shaped portion of the teeth extend radially beyond the pitch diameter to insure good tooth contact throughout.

In accordance with conventional design of spline teeth, the portion S'' is of correct configuration and therefore the displacement angularly between the surfaces S'' and S' is a measure of the wear on the teeth.

In accordance with the invention, the wear is measured by providing two gauge members 20, 21, that are coaxial and have teeth 22, 23, respectively, the addendum on the teeth 22 being shorter than the addendum on the teeth 23. When the gauge members 20, 21 which normally have their teeth axially aligned are brought into position adjacent the spline of the workpiece W which is to be gauged and they are rotated relative to one another, the surface of the teeth 22 will engage the surfaces S' and the surface of the teeth 23 will engage the surface S'' producing a relative displacement between the two members 20, 21 as a measure of the amount of wear of the spline teeth.

As shown in FIGS. 1 and 2-7, the gauge members 20, 21 are mounted on a body 24. Specifically, the body 24 has an opening 25 therein and the gauge member 20 is held in position on the body 24 by screws 26. Member 20 includes a flange 27 that engages a shoulder 28 in the body 24.

The member 21 is annular in configuration and abuts the surface 29 of the gauge member 20. Gauge member 21 includes a flange 30 that engages a groove 31 in a ring 32 that is mounted on the body 24 by screws 33 (FIG. 6) to retain the second gauge member 21 axially on the body 24. As shown in FIG. 4, the teeth 22, 23 extend radially inwardly for gauging the external spline of the workpiece W.

As shown in FIGS. 1 and 4, means are provided for yieldingly urging the gauge member 21 to a normal position wherein the teeth 22, 23 are aligned except when the member 21 is displaced circumferentially. This means comprises a T-shaped lever 35 which has arms 36 urged against pins 37 on the body 24, by a spring loaded ball 38. A screw 39 urges the spring 40' against the ball 38. Lever 35 includes a leg 40 that supports a pin 41 which engages radial slot 42 in the flange 30 of the gauge member 21. By this arrangement the teeth 22, 23 are normally maintained in axial alignment. However, when a workpiece W is inserted in the gauge and rotated manually the surfaces of the teeth on the workpiece engage the teeth on the member 21 rotating the member 21 relative to the member 20 and thereby unbalancing the alignment of the spring loaded bolt 39 with the axis of the leg 40 so that now the ball 38 acts to yieldingly urge the member 21 in one direction or the other.

As shown in FIG. 1, threaded screws 43 having tapered ends are adapted to engage surfaces 44 in the periphery of the gauging member 21 to limit the permissible movement of the gauging member relative to the gauging member 20. The screws 43 are locked in their position radially by set screws 45.

The gauge shown in FIGS. 8–12 is adapted for gauging internal splines. This gauge has the further advantage that it includes provision for controlling the force with which the gauging members are moved against the teeth of the spline, as presently described.

As shown in FIGS. 8–10, the gauge comprises a body 50 that includes two sections 51, 52 held in assembled relation by screws 53. A first tubular gauging element 54 extends axially from the body section 52 and has circumferentially spaced teeth 55. A second tubular gauging member 56 is rotatably mounted within the member 54 and has radially extending teeth 57 adjacent to teeth 55. A third tubular gauging member 58 having teeth 58' is fixed by a pin 59 on a rod 60 which is concentric with the members 54, 56 and extends axially through a space 61 in the body section 51. A bushing 62 is fixed on the rod 60 and extends through an opening 63 in the body section 51. A lever 64 having a knob 65 thereon is fixed on the rod 60. A spring loaded plunger 66 in the lever 64 is adapted to selectively engage one of three detents 67, 68, 69 in the external surface of the body section 51.

The tubular gauge member 56 also extends into the space 61 and has a pivot lever 70 (FIG. 10) fixed thereto by a set screw 71. The lower end of the pivot lever 70 has a slot 72 therein that is engaged by a pin 73 on a lever 74. The lever 74 has notches 75 thereon which are yieldingly urged against pins 76 by a spring loaded plunger 77 held in position by a screw 78. In this fashion, with lever 64 in position engaging detent 67, the tubular member 56 is yieldingly urged to a position wherein the teeth 57 thereof are aligned with the teeth 55 of the first gauging member 54. Stop screws 79 are adapted to engage the lever 74 to limit the rotational movement of the tubular member 56 with respect to the fixed gauging member 54.

Pins 76 are mounted on a removable member 80, the position of which is angularly adjustable by loosening a set screw 81 that holds a cap 82 against the outer surface of the body section 51. A dial indicator 83 is mounted on the body section 51 and has its plunger 84 engaging the pin 85 on the pivot lever 70. Any rotation of gauging member 56 relative to gauging member 54 will cause lever 70 to pivot and, in turn, cause lever 74 to pivot about one of the pins 76, depending on the direction of rotation of member 56, and thereby produce a reading on dial indicator 83.

In use the spline to be gauged is brought in position with the teeth of the spline being gauged adjacent the teeth 55, 57, 58'. The lever 64 is then moved in one direction or another to bring the detent thereon into engagement thereof with one of the detents 67, 68, 69. This forces the teeth 58' of the third gauging member 58 against one surface of the teeth of the spline being gauged (FIG. 12). This produces a reaction force through rod 60 forcing the body and, in turn, teeth 55, 57 into engagement with the opposite surfaces of the teeth of the spline being gauged. Since the addendum of the teeth 57 is longer than the addendum of the teeth 55, 58', it will engage the surfaces S'' adjacent the base of the teeth while the teeth 55 will engage the surfaces S' so that there will be a relative rotational displacement between the members 54, 56 resulting in a visual indication on the gauge 83 that is directly related to the degree of wear between the surfaces S' and S''.

In the form of the invention shown in FIGS. 13–21, the gauge is similar to that shown in FIGS. 8–12 except that it is utilized for gauging external splines.

Figure 14:
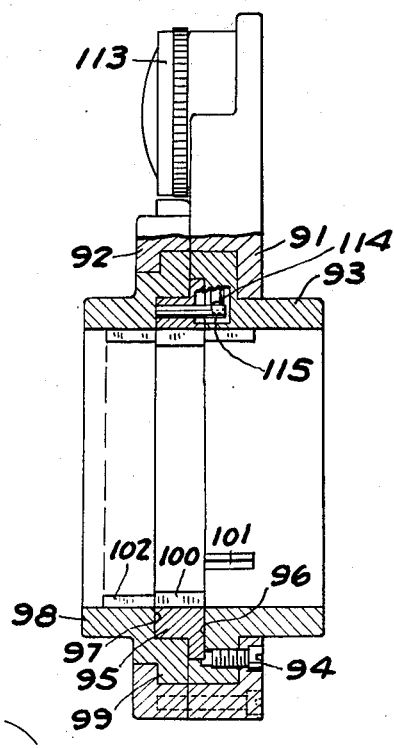
FIG. 14 is a sectional view taken along the line 14—14 in FIG. 13.
Figure 15:
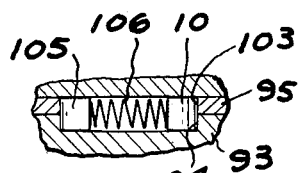
FIG. 15 is a fragmentary sectional view taken along the line 15—15 in FIG. 13.
Figure 17:
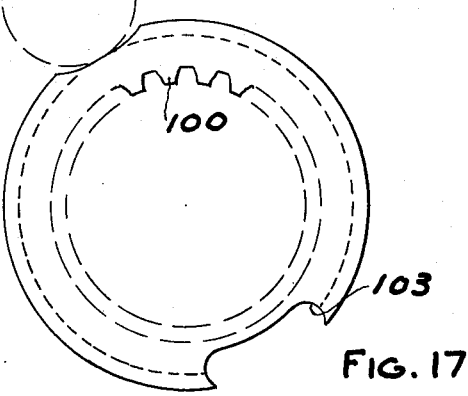
FIG. 17 is a partly diagrammatic front view of a portion of the gauge shown in FIG. 13.
Figure 16:
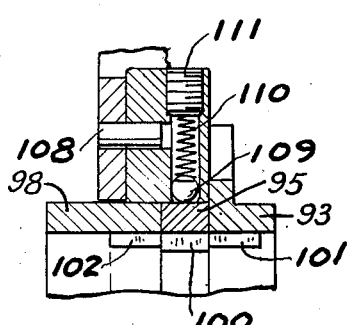
FIG. 16 is a fragmentary sectional view taken along the line 16—16 in FIG. 13.
Figure 18:
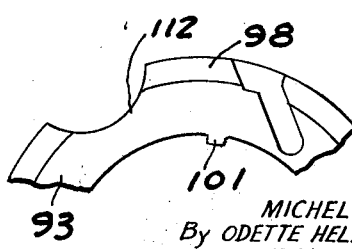
FIG. 18 is a partly diagrammatic fragmentary view of another portion of the gauge shown in FIG. 13.
Figure 19:
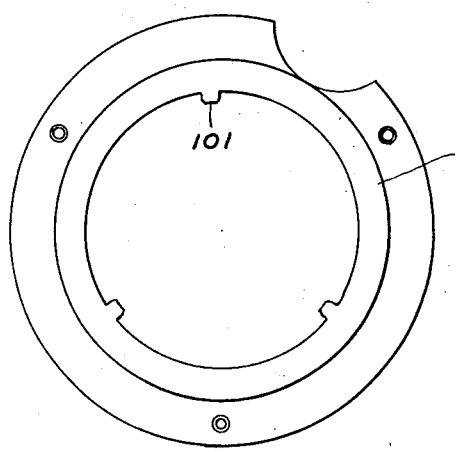
FIG. 19 is a plan view of a portion of the gauge shown in FIGS. 13 and 14.
Figure 20:
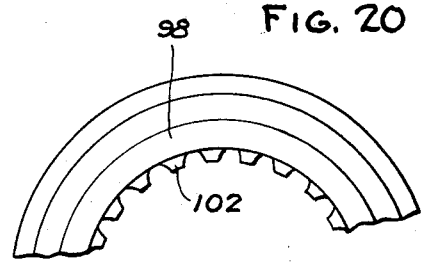
FIG. 20 is a fragmentary plan view of another portion of the gauge shown in FIGS. 13 and 14.

Referring to FIGS. 13 and 14, the gauge comprises a body 90 having two sections 91, 92. A first gauging member 93 is fixed on the body section 91 by screws 94. A second gauging member 95 is rotatably mounted within the gauge by engagement of the surface 96 of member 93 and a groove of shoulder 97 in a third gauging member 98 that is rotatably mounted in the body by a flange 99 thereon that is held in position by the body section 92.

As in the previous forms of the invention, the teeth 100 of the second gauging member 95 have a longer addendum than the teeth 101 of the first gauging member 93 and the teeth 102 of the third gauging member 98, the latter teeth 101, 102 having substantially equal lengths.

As shown in FIGS. 13, 15, 17, and 18, means are provided for yieldingly holding the teeth 100 of second gauging member 95 in axial alignment with the teeth 101 of the first gauging member 93. This comprises elongated circumferentially extending slots 103, 104 in the members 93, 95 that are normally aligned. Pins 105 are normally urged outwardly by a spring 106 against the extremities of the slots 103, 104 thereby maintaining the member 95 in circumferentially aligned position with respect to the member 93.

A knob 107 is rotatably mounted on the body 90 by a pin 108 and supports a spring loaded ball 109 urged by a spring 110 held in position by set screw 111. The spring loaded ball engages an arcuate surface 112 in the periphery of the gauging member 98.

When it is desired to gauge a part, the part is brought into position with its spline teeth adjacent the spline teeth 100, 101, 102 and the knob 107 is manipulated to rotate the knob and move the ball 109 so that it yieldingly urges the member 98 circumferentially bringing the teeth 102 thereof into engagement with the one side surface of the teeth of the spline being gauged. This produces a reaction force through the knob 107 and body 90 that urges the body 90 and, in turn, teeth 100, 101 against the opposite surfaces of the teeth 100, 101 being gauged.

As in the previous form of the invention, the addendum of the teeth 100 being longer will engage the surfaces S'' of the teeth more nearly near the base of the teeth being gauged while the teeth 101 being shorter will engage the surfaces S' of the teeth of the spline being gauged along the portion that may have worn so that a relative circumferential displacement will occur between the members 93, 95 that is a measure of the wear. The gauge includes a dial indicator 113 that has its plunger 114 engaging a pin 115 on the member 95 to measure the circumferential displacement of the member and in turn of the wear that is being sensed by the member.

It can be appreciated that although the gauge members shown in the various forms of the invention have a number of teeth corresponding to the number of teeth of the spline being gauged, such is not essential, and the various gauge members can have a lesser number of circumferentially spaced teeth.

Thus, in the form of the invention shown in FIGS. 13–18, only three teeth 101 are provided at substantially equally spaced points circumferentially. This provides a greater likelihood that severe non-uniform wear on only a few of the teeth being engaged will be ascertained. The greater the number of teeth the more likelihood of checking for minimum wear rather than maximum wear of the gear.

Figure 21:
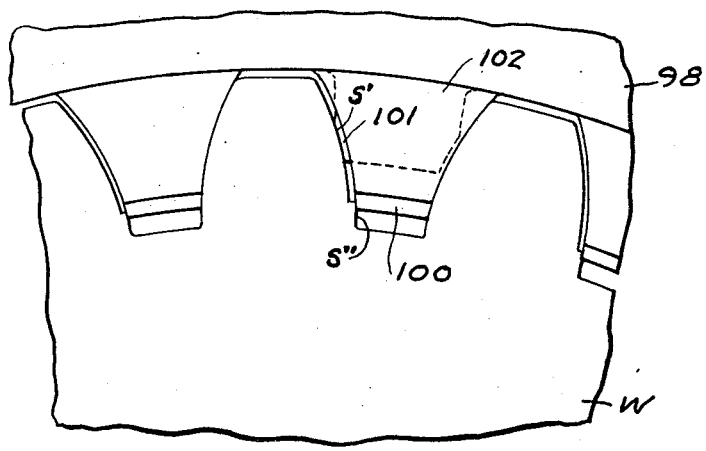
FIG. 21 is a fragmentary plan view on an enlarged scale of a portion of the gauge showing the parts in gauging position on a workpiece.

As further shown in FIG. 21, each of the teeth 101 is shaped so that it engages the teeth of the gear being checked at the pitch line only. This insures that the gauging will occur at the important and critical portion of a wear where it is desired to check the gear.

We claim:
1. In a spline wear gauge, the combination comprising
a body,
a first gauge member having circumferentially spaced teeth,
a second gauge member having circumferentially spaced teeth,
said members being coaxially aligned and in one position having the teeth thereof axially aligned,
the addendum on at least one of the teeth on one of said gauge members being longer than the addendum of the teeth on the other of said gauge members,
whereby when said gauge is brought into position adjacent a spline to be gauged and said members are rotated relative to one another, the addendum of the teeth of one of the members will engage the teeth of the spline being gauged at one portion thereof and the addendum of the teeth on the other of said gauge members will engage the teeth of the spline being gauged at another point radially of the teeth so that the relative displacement angularly of the members will be a measure of the wear of the teeth.

2. The combination set forth in claim 1 including means to yieldingly urge said members into the position wherein said teetth are axially aligned.

3. The combination set forth in claim 2 including means operable to yieldingly urge said gauge members circumferentially relative to one another.

4. The combination set forth in claim 1 wherein said teeth on said gauge members extend radially inwardly for gauging an external spline.

5. The combination set forth in claim 1 wherein said teeth on said gauge members extend radially outwardly for gauging an internal spline.

6. The combination set forth in claim 1 including means for normally holding said gauge members with the teeth in axial alignment,
said means being responsive to relative movement of the gauge members to yieldingly urge the gauge members apart.

7. The combination set forth in claim 6 wherein said last-mentioned means comprises a generally T-shaped member,
spaced pins on one of said gauge members supporting the arms of said T-shaped member, means yieldingly urging said T-shaped member against said pins,
the leg of said T-shaped member engaging the other of said gauge members.

8. The combination set forth in claim 7 including means for limiting the relative rotational movement of said gauge members.

9. The combination set forth in claim 1 including a gauge mounted on said body and responsive to relative rotational movement between said gauge members for producing a visual indication of the wear on the spline being gauged.

10. The combination set forth in claim 1 including an additional gauge member rotatably mounted on said body,
and means for moving said additional gauge member relative to said other gauge members a predetermined distance circumferentially to engage the opposite faces of the teeth of the spline being gauged and thereby produce a reaction force for urging the teeth of the first two mentioned gauge members against the opposite surfaces of the teeth of the spline being gauged.
said additional gauge member having circumferentially spaced teeth, the addendum of the teeth on said additional gauge member being less than addendum of the teeth on said first-mentioned gauge member.

11. In a spline wear gauge, the combination comprising
a body,
a first gauge member having circumferentially spaced teeth,
a second gauge member having circumferentially spaced teeth,
said members being coaxially aligned and in one position having the teeth thereof axially aligned,
the addendum on at least one of the teeth on one of said gauge members being longer than the addendum of the teeth on the other of said gauge members,
a third gauge member rotatably mounted on said body, the addendum of the teeth on said first and third gauge members being substantially equal, the addendum of the teeth on said second gauge member being longer than the addendum of the teeth on said first and third gauge members, and means for rotating said third gauge member relative to said first and second gauge members so that a reaction force is produced against one face of the teeth of the spline being gauged to urge the first and second gauge members against the opposite surfaces of the teeth of the spline member being gauged,
whereby when said gauge is brought into position adjacent a spline to be gauged, the addendum of the teeth of said second member will engage the teeth of the spline being gauged at one portion thereof and the addendum of the teeth on the other of said first gauge members will engage the teeth of the spline being gauged at another point radially of the teeth so that the relative displacement angularly of the first and second members will be a measure of the wear of the teeth.

12. The combination set forth in claim 11 wherein said teeth on said gauge members extend radially outwardly for gauging an internal spline.

13. The combination set forth in claim 12 wherein said means for rotating said third gauge member relative to said first and second gauge members comprises a rod coaxially aligned with said gauge members and extending therethrough,
a handle on said rod, and
gauging means between said handle and said body for holding said handle and in turn said rod in predetermined positions on said body.

14. The combination set forth in claim 13 including means yieldingly urging said second gauge member into position wherein the teeth on said second gauge member are aligned with the teeth on saiid first gauge member.

15. The combination set forth in claim 14 wherein the teeth of said gauge member having the shorter addendum are shaped so that they engage the spline being gauged substantially only in the area of the pitch line of the teeth of the spline.

16. The combination set forth in claim 14 wherein said last-mentioned means comprises a pivot member fixed to the second gauge member and extending radially therefrom,
a lever movably mounted on said body between predetermined limits,
and means interconnecting between said pivot member and said lever, said body having a pair of pins, and means yieldingly urging said lever against said pins.

17. The combination set forth in claim 16 including gauge means on said body responsive to the movement of said pivot member for producing a visual indication of the relative movement of said second gauge member with respect to said first gauge member.

18. The combination set forth in claim 11 wherein the teeth of said gauge members extend radially inwardly for gauging an external spline.

19. The combination set forth in claim 18 including means yieldingly urging said first and second members into a position wherein the teeth thereof are axially aligned.

20. The combination set forth in claim 19 wherein said last-mentioned means comprises elongated circumferentially extended openings in each of said first and second gauge members, pins in said openings, and means yieldingly urging said pins away from one another.

21. The combination set forth in claim 20 wherein said means for moving said third gauge member circumferentially relative to said first and second gauge members comprises a manually operated knob rotatably mounted on said body with its axis spaced from the axis of said gauge members, and means on said knob engaging said third gauge member for rotating said gauge member.

22. The combination set forth in claim 21 wherein said last-mentioned means comprises a spring-loaded ball on said knob, said third gauge member having an arcuate surface thereon engaged by said ball upon rotation of said knob.

23. The combination set forth in claim 22 including gauge means on said body, said gauge means having means thereon responsive to the movement of said second gauge member for visually indicating the relative movement of said second gauge member with respect to said first gauge member.

References Cited

UNITED STATES PATENTS

| 2,849,802 | 9/1958 | Stapleton | 33—179.5 |
| 3,214,843 | 11/1965 | Bassoff | 33—179.5 |

FOREIGN PATENTS 601,612   8/1934   Germany.

LOUIS R. PRINCE, Primary Examiner

H. C. POST III, Assistant Examiner

U.S. Cl. X.R.

73—162